United States Patent
Choi et al.

(10) Patent No.: US 10,209,434 B2
(45) Date of Patent: Feb. 19, 2019

(54) BACKLIGHT UNIT AND DISPLAY DEVICE INCLUDING THE SAME

(71) Applicant: Samsung Display Co., Ltd., Yongin-si, Gyeonggi-do (KR)

(72) Inventors: Seongsik Choi, Seoul (KR); Myoungseok Son, Yongin-si (KR); Kwangwook Choi, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 233 days.

(21) Appl. No.: 15/076,789

(22) Filed: Mar. 22, 2016

(65) Prior Publication Data

US 2016/0363723 A1    Dec. 15, 2016

(30) Foreign Application Priority Data

Jun. 10, 2015 (KR) .................. 10-2015-0081824

(51) Int. Cl.
*G02F 1/1333* (2006.01)
*F21V 8/00* (2006.01)

(52) U.S. Cl.
CPC ......... *G02B 6/0091* (2013.01); *G02B 6/0088* (2013.01); *G02F 1/133308* (2013.01); *G02B 6/005* (2013.01); *G02F 2001/133314* (2013.01); *G02F 2001/133328* (2013.01)

(58) Field of Classification Search
CPC ... G02F 1/133308; G02F 2001/133328; G02B 6/0093
USPC .............................. 349/58, 60; 362/632–634
See application file for complete search history.

(56) References Cited

U.S. PATENT DOCUMENTS

| | | | |
|---|---|---|---|
| 8,167,628 B2 | 5/2012 | Yoon et al. | |
| 8,520,162 B2* | 8/2013 | Tang | G02F 1/133615 349/58 |
| 8,582,048 B2* | 11/2013 | Yu | G02B 6/0088 349/58 |
| 8,917,367 B2* | 12/2014 | Zhou | G09F 13/04 349/62 |
| 8,928,580 B2 | 1/2015 | Hwang et al. | |
| 2006/0098153 A1 | 5/2006 | Slikkerveer et al. | |
| 2006/0227572 A1* | 10/2006 | Chen | G02B 6/009 362/633 |
| 2008/0129921 A1* | 6/2008 | Huang | G02F 1/133308 349/60 |
| 2009/0175020 A1* | 7/2009 | Zadesky | G06F 1/1626 361/818 |
| 2009/0225255 A1* | 9/2009 | Hsiao | G02F 1/133602 349/58 |

(Continued)

FOREIGN PATENT DOCUMENTS

KR    1020050085066 A    8/2005
KR    1020090030748 A    3/2009

(Continued)

*Primary Examiner* — Julie Bannan
(74) *Attorney, Agent, or Firm* — Cantor Colburn LLP

(57) ABSTRACT

A backlight unit includes: a light source which generates light; and frame members which accommodate the light source therein. The frame members include: a first frame member which is bent in at least one direction and includes a superelastic alloy; and a second frame member which overlaps an edge portion of the first frame member and includes an elastomer.

22 Claims, 4 Drawing Sheets

(56) References Cited

U.S. PATENT DOCUMENTS

| | | | |
|---|---|---|---|
| 2010/0033648 A1* | 2/2010 | Kaganezawa | G02F 1/133305 349/58 |
| 2010/0171900 A1* | 7/2010 | Lee | G02B 6/0051 349/58 |
| 2013/0021554 A1* | 1/2013 | Park | C09D 4/06 349/58 |
| 2013/0155654 A1* | 6/2013 | Lin | G02F 1/133308 362/97.1 |
| 2013/0307816 A1* | 11/2013 | Lee | G06F 1/1652 345/174 |
| 2014/0002767 A1* | 1/2014 | Chen | G02F 1/133308 349/60 |
| 2014/0022483 A1* | 1/2014 | Kuo | H05K 7/18 349/58 |
| 2014/0022488 A1* | 1/2014 | Yu | G02F 1/133308 349/60 |
| 2014/0098095 A1 | 4/2014 | Lee et al. | |
| 2014/0118910 A1* | 5/2014 | Sung | G09F 9/301 361/679.01 |
| 2014/0125913 A1* | 5/2014 | Lee | G02B 6/0093 349/58 |
| 2015/0160407 A1* | 6/2015 | Hsiao | G02F 1/133308 349/65 |
| 2015/0261033 A1* | 9/2015 | Shin | H05K 5/0086 349/58 |
| 2015/0331179 A1* | 11/2015 | Li | G02F 1/133608 362/615 |
| 2016/0088745 A1* | 3/2016 | Lee | G02F 1/133308 361/749 |
| 2016/0195938 A1* | 7/2016 | Kim | H04B 1/3827 345/156 |
| 2016/0252236 A1* | 9/2016 | Chen | G02F 1/133 362/97.1 |
| 2016/0299283 A1* | 10/2016 | Yu | H01L 51/5237 |

FOREIGN PATENT DOCUMENTS

| | | |
|---|---|---|
| KR | 1020110048640 A | 5/2011 |
| KR | 1020140044665 A | 4/2014 |
| KR | 1020140053716 A | 5/2014 |

* cited by examiner

BACKLIGHT UNIT AND DISPLAY DEVICE INCLUDING THE SAME

This application claims priority to Korean Patent Application No. 10-2015-0081824, filed on Jun. 10, 2015, and all the benefits accruing therefrom under 35 U.S.C. § 119, the content of which in its entirety is herein incorporated by reference.

BACKGROUND

1. Field

Exemplary embodiments of the invention relate to a backlight unit in which a flexible display panel is supported and fixed and a display device including the backlight unit.

2. Description of the Related Art

Display devices are classified into liquid crystal display ("LCD") devices, organic light emitting diode ("OLED") display devices, plasma display panel ("PDP") devices, electrophoretic display ("EPD") devices, and the like, based on a light emitting scheme thereof.

A display device includes a display panel configured to display an image, various optical components configured to enhance optical properties of the display panel, and frames configured to support and fix the various optical components.

For a flexible display panel in which the display panel is bent in at least one direction, the display panel is supported and fixed by frames capable of being bent in a direction the same as the direction in which the display panel is bent.

However, when being bent in one direction, a conventional frame including or formed of a metal material may undergo a fatigue fracture or may be permanently deformed, since compressive force and tensile force are simultaneously exerted to the frame. In addition, as the conventional frame is bent, the various optical components accommodated within the frame may be undesirably misaligned.

SUMMARY

Exemplary embodiments of the invention are directed to a backlight unit in which a flexible display panel is supported and fixed, and a display device including the backlight unit.

According to one exemplary embodiment of the invention, a backlight unit includes: a light source which generates light; and frame members which accommodate the light source therein. The frame members may include: a first frame member which is bent in at least one direction and includes a superelastic alloy; and a second frame member which overlaps an edge portion of the first frame member and includes an elastomer.

The superelastic alloy may include at least one selected from a shape memory alloy, an Ni—Ti alloy, an Ni—Al alloy, a Cu—Zn—Ni alloy, a Cu—Al—Ni alloy, a Cu—Al—Mn alloy, a Ti—Ni—Cu—Mo alloy, a Co—Ni—Ga:Fe alloy, an Ag—Ni alloy, an Au—Cd alloy, a Fe—Pt alloy, a Fe—Ni alloy and an In—Cd alloy.

The elastomer may include at least one selected from polydimethyl siloxane, polysilicon, polyurethane, and a styrene block copolymer.

The first frame member may define a penetration hole therein at the edge portion thereof.

The penetration hole may have one of a circular shape, an elliptical shape, and a slot shape.

The second frame member may define a coupling portion thereof which is coupled to the penetration hole of the first frame member.

The coupling portion may define an inserting portion thereof which extends through the penetration hole of the first frame member and a fixing portion thereof extended from the inserting portion and disposed outside the penetration hole of the first frame member.

The fixing portion of the second frame member may have one of a hook shape and a wedge shape.

The first frame member may define a first penetration hole therein at the edge portion thereof, the first penetration hole having substantially a same diameter as a diameter of the inserting portion of the second frame member.

The first frame member may define a second penetration hole therein extending parallel to a direction in which the first frame member is bent.

The second penetration hole may define: in the direction in which the first frame member is bent, a length thereof greater than the diameter of the inserting portion, and in a direction perpendicular to the direction in which the first frame member is bent, a width substantially the same as the diameter of the inserting portion.

In the direction in which the first frame member is bent, a distance between the light source and the first penetration hole may be less than a distance between the light source and the second penetration hole.

The second frame may include a superelastic wire-shaped member disposed therewithin.

The superelastic wire may include at least one selected from a shape memory alloy, an Ni—Ti alloy, an Ni—Al alloy, a Cu—Zn—Ni alloy, a Cu—Al—Ni alloy, a Cu—Al—Mn alloy, a Ti—Ni—Cu—Mo alloy, a Co—Ni—Ga:Fe alloy, an Ag—Ni alloy, an Au—Cd alloy, a Fe—Pt alloy, a Fe—Ni alloy and an In—Cd alloy.

The superelastic wire-shaped member disposed within the second frame member may have a closed-loop shape.

According to one exemplary embodiment of the invention, a display device includes: a display panel which is bent in at least one direction and displays an image with light; a light source which generates and provides the light to the display panel;

and frame members which accommodate the display panel and the light source therein. The frame members may include: a first frame member which is bent in a same direction in which the display panel is bent and includes a superelastic alloy; and a second frame member which overlaps an edge portion of the first frame member and includes an elastomer.

The superelastic alloy may include at least one selected from a shape memory alloy, an Ni—Ti alloy, an Ni—Al alloy, a Cu—Zn—Ni alloy, a Cu—Al—Ni alloy, a Cu—Al—Mn alloy, a Ti—Ni—Cu—Mo alloy, a Co—Ni—Ga:Fe alloy, an Ag—Ni alloy, an Au—Cd alloy, a Fe—Pt alloy, a Fe—Ni alloy, and an In—Cd alloy.

The elastomer may include at least one selected from polydimethyl siloxane, polysilicon, polyurethane, and a styrene block copolymer.

The first frame member may define a penetration hole therein at the edge portion thereof.

The second frame member may define a coupling portion thereof which is coupled to the penetration hole of the first frame member.

Accordingly, in the backlight unit and the display device which includes the backlight unit according to exemplary embodiments of the invention, the frame members which support and fix the flexible display panel include or are formed of a superelastic alloy and a highly elastic polymer material, and thus where an external force is imposed to the display device, the frame members are elastically deformed from an initial shape (e.g., flat) state thereof along with the display panel and where the external force is removed, the frame members are elastically restored into the initial shape.

Further, in the backlight unit and the display device which includes the backlight unit according to exemplary embodiments of the invention, the frame members which support and fix the flexible display panel may reduce gaps therein due to misalignment between the optical components, such that misalignment among the optical components, which occurs when the display device is bent, may be significantly reduced or effectively prevented.

The foregoing is illustrative only and is not intended to be in any way limiting.

In addition to the illustrative embodiments, and features described above, further embodiments, and features will become apparent by reference to the drawings and the following detailed description.

BRIEF DESCRIPTION OF THE DRAWINGS

The above and other features of the present disclosure of invention will be more clearly understood from the following detailed description taken in conjunction with the accompanying drawings, in which.

DETAILED DESCRIPTION

Figure 1:
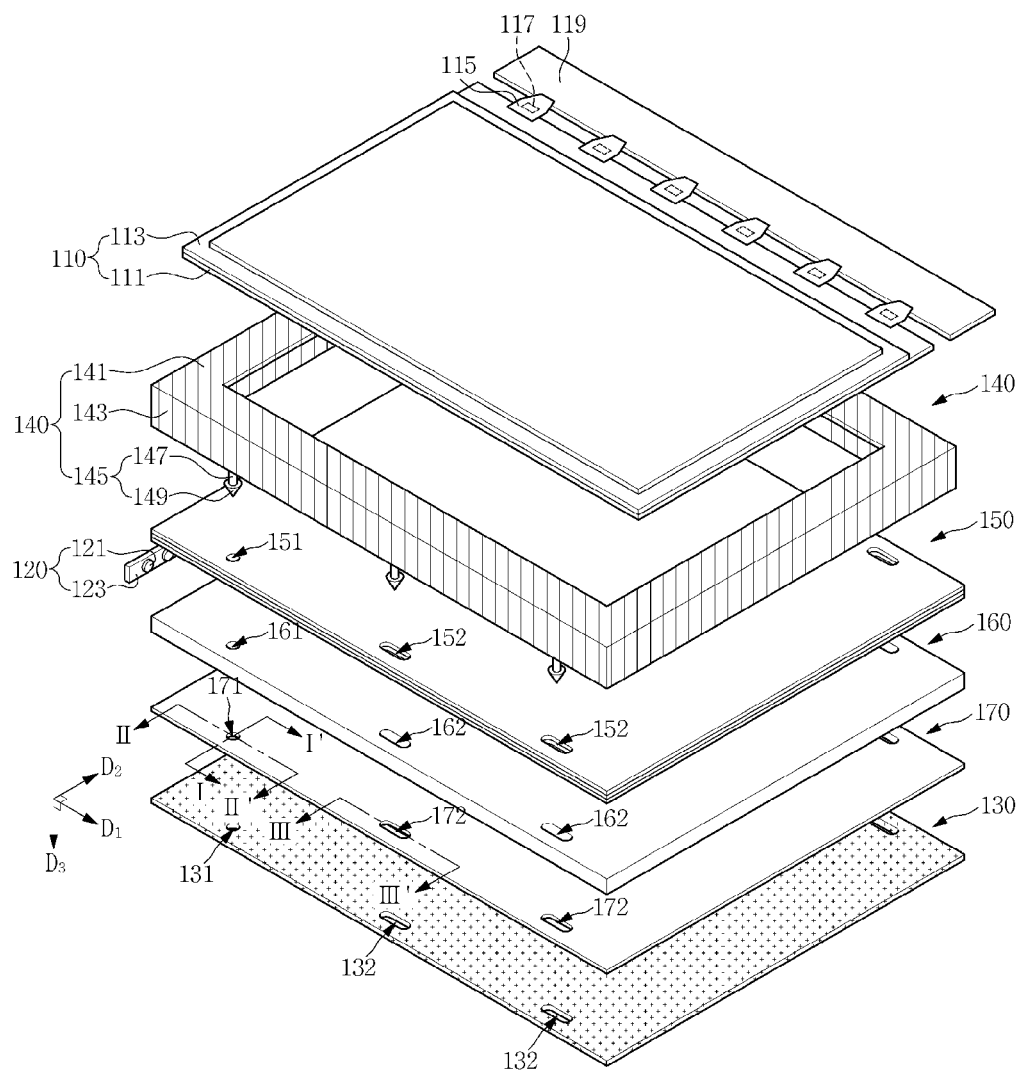
FIG. 1 is an exploded perspective view illustrating an exemplary embodiment of a display device according to the invention.

Hereinafter, exemplary embodiments of the invention of invention will be described in more detail with reference to the accompanying drawings.

Although the invention can be modified in various manners and have several embodiments, specific embodiments are illustrated in the accompanying drawings and will be mainly described in the specification. However, the scope of the embodiments of the invention is not limited to the specific embodiments and should be construed as including all the changes, equivalents, and substitutions included in the spirit and scope of the invention.

In the drawings, certain elements or shapes may be simplified or exaggerated to better illustrate the invention, and other elements present in an actual product may also be omitted. Like reference numerals refer to like elements throughout the specification. Thus, the drawings are intended to facilitate the understanding of the invention.

Throughout the specification, when an element is referred to as being "connected" to another element, the element is "physically connected" to the other element or "electrically connected" to the other element with one or more intervening elements interposed therebetween. When an element is referred to as being "directly connected" to another element, the element is "directly physically connected" to the other element or "directly electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Some of the parts which are not associated with the description may not be provided in order to specifically describe embodiments of the invention, and like reference numerals refer to like elements throughout the specification.

Hereinbelow, in an exemplary embodiment, a display device is described as a liquid crystal display ("LCD") device, but the invention is not limited thereto. In other exemplary embodiments, for example, the display device according to the invention may be an organic light emitting diode ("OLED") display device or a plasma display panel ("PDP") device.

In addition, hereinbelow, the exemplary embodiment display device is described as including an edge-type backlight unit, but the invention is not limited thereto. In other exemplary embodiments, for example, the display device may include a direct-type backlight unit or a corner-type backlight unit.

Figure 2:
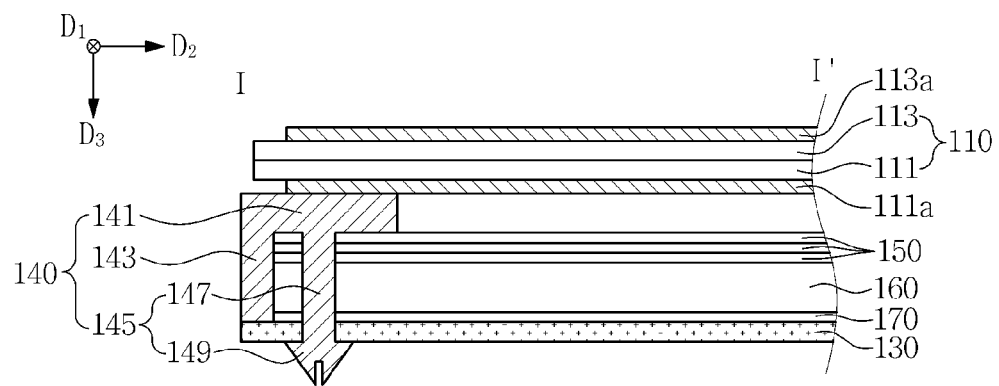
FIG. 2 is a cross-sectional view taken along line I-I' of FIG. 1.

FIG. 1 is an exploded perspective view illustrating an exemplary embodiment of a display device according to the invention, and FIG. 2 is a cross-sectional view taken along line I-I' of FIG. 1.

In reference to FIGS. 1 and 2, the display device includes a display panel 110 bent in at least one direction, a light source unit 120 generating and providing light to the display panel 110, a first frame member 130 having a panel shape bent in a direction the same as a direction in which the display panel 110 is bent, a second frame member 140 on an edge portion of the first frame member 130, an optical sheet 150 between the display panel 110 and the first frame member 130, a light guide plate 160 and a reflective sheet 170. Hereinafter, the light source unit 120, the first frame member 130, the second frame member 140, the optical sheet 150, the light guide plate 160 and the reflective sheet 170 are collectively referred to as a backlight unit.

The display panel 110 is configured to receive an electric signal externally applied thereto so as to display an image and may be provided in a quadrangular panel form.

Hereinafter, a direction in which a length of a relatively long side of the display panel 110 extends is referred to as a first direction D1, and a direction in which a length of a relatively short side of the display panel 110 extends is referred to as a second direction D2. The display panel 110 according to the exemplary embodiment may be bent in the first direction D1. However, the invention is not limited thereto, and the display panel 110 may be bent in the second direction D2 or both the first and second directions D1 and D2.

The display panel 110 may include a first substrate 111, a second substrate 113 opposing the first substrate 111, and a liquid crystal layer (not illustrated) between the first substrate 111 and the second substrate 113.

The first substrate 111 and the second substrate 113 may include or be formed of a flexible material.

The first substrate 111 and the second substrate 113 may include or be formed of one selected from kapton, polyethersulphone ("PES"), polycarbonate ("PC"), polyimide ("PI"), polyethyleneterephthalate ("PET"), polyethylenenaphthalate ("PEN"), polyacrylate ("PAR") and fiber reinforced plastic ("FRP").

Among the above-listed materials, polyimide ("PI") is suitable for a material forming the first substrate 111 and the second substrate 113 to have a relatively high thermal-resistance such that the first substrate 111 and the second substrate 113 may undergo a relatively high-temperature process in manufacturing a display device.

In addition, the first substrate 111 and the second substrate 113 may have a cross-section thickness in a range of about 5 micrometer ($\mu m$) to about 200 $\mu m$, and may have a coefficient of thermal expansion ("CTE") in a range of about 3 parts per million per degree Centigrade (ppm/° C.) to about 10 ppm/° C.

The first substrate 111 includes a plurality of pixel electrodes arranged in a matrix form, a thin film transistor configured to apply a driving voltage to the respective pixel electrodes, and various signal lines configured to drive the pixel electrode and the thin film transistor, on a first base substrate.

The second substrate 113 is disposed to oppose the first substrate 111 and includes a common electrode including a transparent conductive material and a color filter, on a second base substrate. The color filter may include a red color filter, a green color filter and/or a blue color filter.

The liquid crystal layer (not illustrated) is disposed between the first substrate 111 and the second substrate 113, and orientations of liquid crystals therein are rearranged by an electric field formed between the pixel electrode and the common electrode. Accordingly, the rearranged liquid crystal layer adjusts transmittance therethrough of light emitted from a backlight unit, and the adjusted light may be transmitted through the color filter, and thus an image may be displayed externally from the display device.

In addition, a lower polarizer 111a may be disposed on a rear surface of the first substrate 111, and an upper polarizer 113a may be disposed on an upper surface of the second substrate 113. The upper polarizer 113a and the lower polarizer 111a may have a planar area corresponding to that of the display panel 110.

The upper polarizer 113a may transmit light of a predetermined polarization among light being externally incident thereto and may absorb or block other light. The lower polarizer 111a may transmit light of a predetermined polarization among light incident thereto emitted from the backlight unit and may absorb or block other light.

A driving circuit board 119 may further be disposed on at least one side of the display panel 110. The driving circuit board 119 may provide various control signals and power signals to the display panel 110 for driving the display panel 110.

The display panel 110 and the driving circuit board 119 may be electrically connected to each other by at least one flexible printed circuit board ("FPCB") 115. The FPCB 115 may be a chip on film ("COF") or a tape carrier package ("TCP"), and the number of the FPCB may vary based on the size and the driving method of the display panel 110.

A driving chip 117 may be mounted on the FPCB 115. The driving chip 117 may generate various driving signals for driving the display panel 110. The driving chip 117 refers to a chip into which a timing controller and a data driving circuit are integrated, and may be referred to as a driver integrated circuit ("IC") board or a source IC board.

The light source unit 120 includes a light source 121 which generates light and a light source substrate 123 on which the light source 121 is disposed. The light source 121 may be provided in plural on a single one light source substrate 123.

The light source 121 may be disposed at an edge portion or at a light incident side surface of the light guide plate 160. In other words, the light source 121 may emit light toward the edge portion or the light incident side surface of the light guide plate 160. The light source 121 may include at least one LED chip (not illustrated) and a package (not illustrated) which accommodates the LED chip therein. In an exemplary embodiment, for example, the LED chip (not illustrated) may be a gallium nitride (GaN)-based LED chip that generates and emits blue light.

The number of the light sources 121 may vary in consideration of size and luminance uniformity of the display panel 110. The light source substrate 123 may include a printed circuit board ("PCB") or a metal PCB.

The light source unit 120 may be provided at one, two or four side surfaces of the light guide plate 160 in consideration of the size and luminance uniformity of the display panel 110. The light source unit 120 according to the exemplary embodiment is described as being disposed at a relatively short side of the light guide plate 160 but is not limited thereto.

Although not illustrated, a wavelength conversion unit (not illustrated) may further be disposed between the light source unit 120 and the light guide plate 160 in a light emitting direction of the light source unit 120. The wavelength conversion unit (not illustrated) may include a substance capable of changing a wavelength of light. In an exemplary embodiment, for example, the wavelength conversion unit may change a wavelength of blue light emitted from a blue LED light source, so that the blue light may be converted to white light.

The first frame member 130 is configured to maintain an overall a framework of the display device and protect various components accommodated thereon. The first frame member 130 supports thereon various components such as the display panel 110, the light source unit 120, the second frame member 140, the optical sheet 150, the light guide plate 160 and the reflective sheet 170. The first frame member 130 may have substantially the same planar area as that of the display panel 110.

The first frame member 130 may include a superelastic alloy. Such a superelastic alloy may include at least one selected from a shape memory alloy, an Ni—Ti alloy, an Ni—Al alloy, a Cu—Zn—Ni alloy, a Cu—Al—Ni alloy, a Cu—Al—Mn alloy, a Ti—Ni—Cu—Mo alloy, a Co—Ni—Ga: Fe alloy, an Ag—Ni alloy, an Au—Cd alloy, a Fe—Pt alloy, a Fe—Ni alloy and an In—Cd alloy.

The superelastic alloy is a material that is elastically deformed when an external force is applied thereto, and is elastically restored when the applied external force is removed. Accordingly, where an external force is applied to the first frame member 130, from an initial shape (e.g., flat) state, the first frame member 130 is bent in a direction along with the display panel 110 which is bent in a direction, and where the applied external force is removed, the first frame member 130 is restored back into the initial flat shape thereof.

In addition, the first frame member 130 may have defined therein one or more penetration holes 131 and 132 at an edge portion thereof. In a top plan view, the penetration holes 131 and 132 may be one of a circular shape, an elliptical shape and a slot shape.

The penetration holes 131 and 132 may be classified into a first penetration hole 131 that is relatively close to the light source unit 120 and a second penetration hole 132 that is relatively far from the light source unit 120, based on the distance from the light source unit 120. Structures of the penetrations holes 131 and 132 will be described further hereinbelow.

The second frame member 140 is disposed on an edge portion of the first frame member 130.

The second frame member 140 supports a rear edge portion of the display panel 110, and provides a space in which the light source unit 120, the optical sheet 150, the light guide plate 160 and the reflective sheet 170 are accommodated.

The second frame member 140 includes a support portion 141 configured to support a rear edge portion of the display panel 110, a side wall portion 143 bent downwards from the support portion 141 and extending therefrom, and at least one coupling portion 145 protruding downwards from the support portion 141 to be coupled to the penetration holes 131 and 132 of the first frame member 130. Portions of the second frame member 140 may define the support portion 141 thereof, the side wall portion thereof 143 and the coupling portion 145 thereof.

The support portion 141 and the side wall portion 143 may have an overall polygonal frame shape. In an exemplary embodiment, for example, the support portion 141 and the side wall portion 143 may have a quadrangular frame shape. The second frame member 140 may be a single unit, but alternatively may collectively include a plurality of separate units combined with each other to form the second frame member 140.

The coupling portion 145 may fix various optical components such as the optical sheet 150, the light guide plate 160 and the reflective sheet 170 with respect to the first frame member 130.

The coupling portion 145 includes an inserting portion 147 protruding downwards from the support portion 141 and a fixing portion 149 which extends from the inserting portion 147. The inserting portion 147 and the fixing portion 149 may define an entirety of the coupling portion 145. The inserting portion 147 may have, for example, a circular cylinder shape having a circular second direction (horizontal in FIG. 2) cross-section or a polygonal cylinder shape having a polygonal horizontal cross-section. The fixing portion 149 may have a hook shape or a wedge shape. Configurations of the coupling portion 145 will be described further hereinbelow.

The second frame member 140 includes an elastomer. The elastomer includes at least one selected from a relatively highly elastic polymer, polydimethyl siloxane, polysilicon, polyurethane and a styrene block copolymer.

As the second frame member 140 includes the elastomer, deformation of the second frame member 140 that is caused by tensile force and compressive force applied to the second frame member 140 when the display device is bent may be significantly reduced or effectively prevented.

Figure 3:
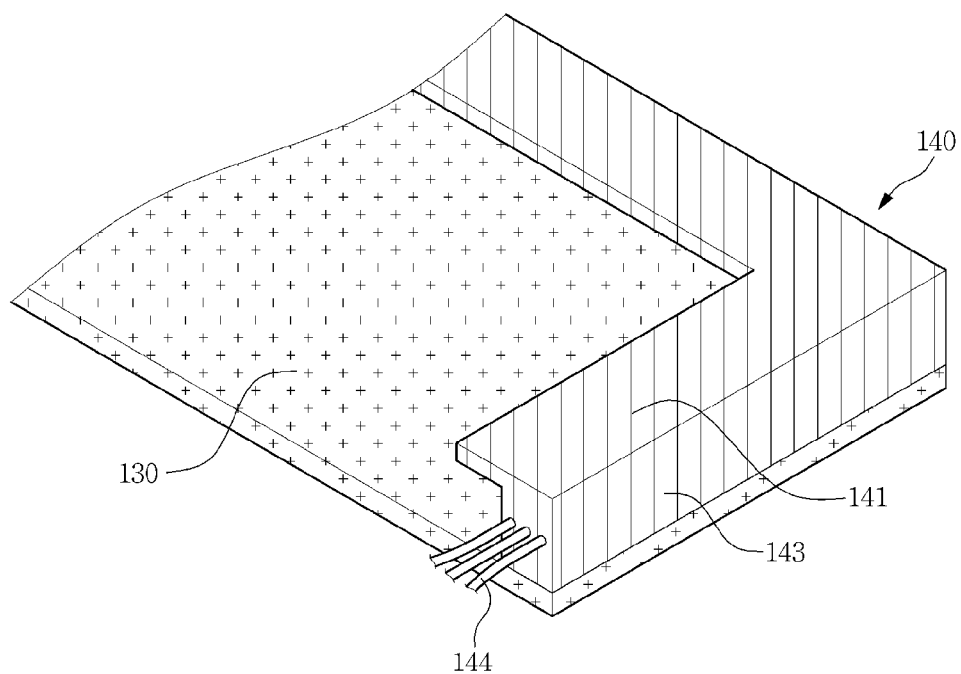
FIG. 3 is a partial perspective view illustrating an exemplary embodiment of a portion of a first frame member and a second frame member according to the invention.

FIG. 3 is a partial perspective view illustrating an exemplary embodiment of a portion of the first frame member 130 and the second frame member 140 according to the invention.

In reference to FIG. 3, the display device includes the first frame member 130 having a panel shape and the second frame member 140 disposed on the edge portion of the first frame member 130.

The second frame member 140 includes the support portion 141 and the side wall portion 143 which is bent downwards from the support portion 141 and extending therefrom, and may have an overall polygonal frame shape. In an exemplary embodiment, for example, the support portion 141 and the side wall portion 143 may have a quadrangular frame shape. The second frame member 140 may be a single unit, but alternatively may include a plurality of separate units which are connected to each other to form the second frame member 140.

Further, the second frame member 140 includes at least one superelastic wire-shaped member 144 (hereinafter "superelastic wire") disposed therein. Where the second frame member 140 has a quadrangular frame shape in the top plan view, the superelastic wire 144 may have a closed-loop shape within an inner area of the second frame member 140.

The superelastic wire 144 may include at least one selected from a shape memory alloy, an Ni—Ti alloy, an Ni—Al alloy, a Cu—Zn—Ni alloy, a Cu—Al—Ni alloy, a Cu—Al—Mn alloy, a Ti—Ni—Cu—Mo alloy, a Co—Ni—Ga: Fe alloy, an Ag—Ni alloy, an Au—Cd alloy, a Fe—Pt alloy, a Fe—Ni alloy, and an In—Cd alloy.

A length of the superelastic wire 144 is disposed along length portions of the second frame member 140. The superelastic wire 144 may have a thickness in a range of about 0.01 µm to about 1000 µm, and the thickness of the superelastic wire 144 may have various values based on the size and shape of the second frame member 140.

The second frame member 140 including the superelastic wire 144 therein has an increased elastic limit, as compared to the second frame member 140 excluding the superelastic wire 144. That is, as the elasticity of the superelastic wire 144 is added to the elasticity of the second frame member 140, flexibility and elasticity may be enhanced.

Accordingly, deformation of the second frame member 140 that is caused by tensile force and compressive force imposed to the second frame member 140 as the display device is bent may be significantly reduced or prevented.

The optical sheet 150 is disposed on the light guide plate 160 and configured to diffuse and/or collimate light directed from the light guide plate 160. The optical sheet 150 collectively includes a diffusion sheet, a prism sheet and/or a protective sheet. The diffusion sheet, the prism sheet and the protective sheet may be sequentially stacked on the light guide plate 160 in the order listed.

The prism sheet may collimate light guided by the light guide plate 160, the diffusion sheet may diffuse light collimated by the prism sheet, and the protective sheet may protect the prism sheet. Light leaving the protective sheet may be directed toward the display panel 110.

The optical sheet 150 may have defined therein one or more penetration holes 151 and 152 at an edge portion thereof. The penetration holes 151 and 152 of the optical sheet 150 correspond to the penetration holes 131 and 132 of the first frame member 130, respectively. That is, the penetration holes 151 and 152 of the optical sheet 150 may have substantially the same shape and the same size as those of the penetration holes 131 and 132 of the first frame member 130.

The light guide plate 160 may uniformly direct light provided from the light source unit 120 to the display panel 110. The light guide plate 160 may be provided as a quadrangular panel shape, but is not limited thereto. When light emitting diode ("LED") chip is used as the light source 121, the light guide plate 160 may have various forms defined therein including predetermined grooves, protrusions or the like based on the position of the light source 121.

Although referred to as a plate such as having a relatively large cross-sectional thickness in a third direction D3 for ease of description, the light guide plate 160 is not limited thereto and may be in a shape of a sheet or a film for which the cross-sectional thickness is smaller than that of the plate and is relatively small as compared to the planar size thereof, so as to achieve slimness in the display device. In other words, the light guide plate 160 is to be understood as having a concept including the plate and the film which guides light provided from the light source unit 120.

The light guide plate 160 may include a light-transmissive material including, for example, acrylic resins, such as polymethylmethacrylate ("PMMA"), or polycarbonate ("PC") so as to guide light efficiently.

The light guide plate 160 may have defined therein one or more penetration holes 161 and 162 at an edge portion thereof. The penetration holes 161 and 162 of the light guide plate 160 correspond to the penetration holes 131 and 132 of the first frame member 130, respectively. That is, the penetration holes 161 and 162 of the light guide plate 160 may have substantially the same shape and the same size as those of the penetration holes 131 and 132 of the first frame member 130.

The reflective sheet 170 may include, for example, polyethylene terephthalate ("PET"), and may reflect light. A surface of the reflective sheet 170 body may be coated with a diffusion layer including, for example, titanium dioxide. In addition, the reflective sheet 170 body may include a material containing metal, such as silver (Ag).

The reflective sheet 170 may have defined therein one or more penetration holes 171 and 172 at an edge portion thereof. The penetration holes 171 and 172 of the reflective sheet 170 correspond to the penetration holes 131 and 132 of the first frame member 130, respectively. That is, the penetration holes 171 and 172 of the reflective sheet 170 may have substantially the same shape and the same size as those of the penetration holes 131 and 132 of the first frame member 130.

Where the light guide plate 160 performs functions of the optical sheet 150 and the reflective sheet 170, the optical sheet 150 and the reflective sheet 170 may be omitted.

Figure 4:
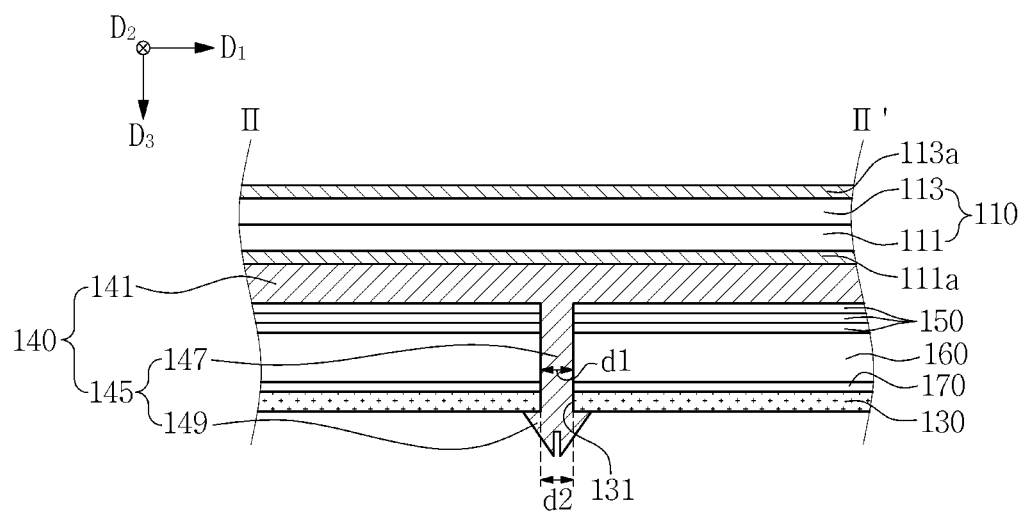
FIG. 4 is a cross-sectional view taken along line II-II' of FIG. 1.
Figure 5:
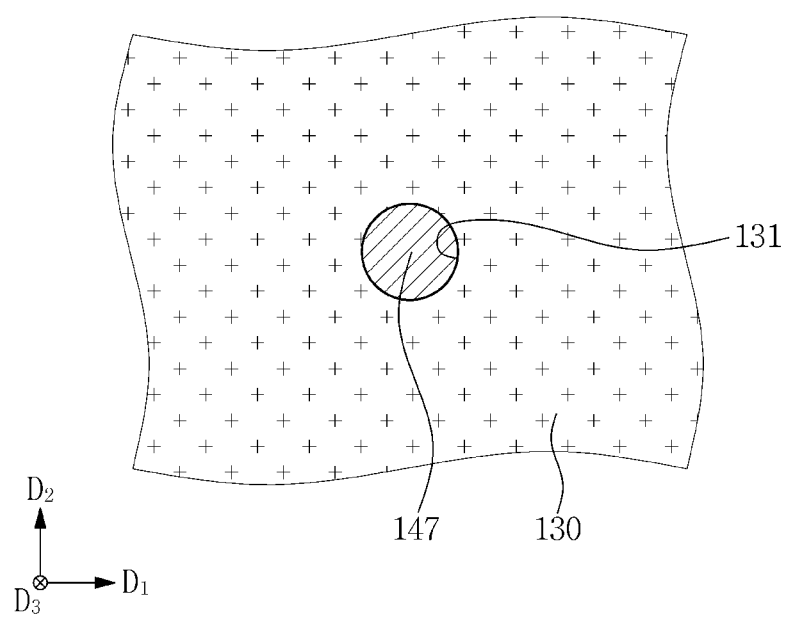
FIG. 5 is a rear view illustrating an enlarged portion of FIG. 4.

FIG. 4 is a cross-sectional view taken along line II-II' of FIG. 1; and FIG. 5 is a rear view illustrating an enlarged portion illustrated in FIG. 4. The fixing portion 149 of the coupling portion 145 will be omitted in FIG. 5 for ease of description.

In reference to FIGS. 4 and 5, the coupling portion 145 of the second frame member 140 extends through the optical sheet 150, the light guide plate 160 and the reflective sheet 170 to be coupled to the first penetration hole 131 of the first frame member 130.

The coupling portion 145 includes the inserting portion 147 in extended through and disposed in the first penetration hole 131 and the fixing portion 149 disposed outside the first penetration hole 131.

The first penetration hole 131 may have the same shape and the same size as those of a horizontal cross-section of the inserting portion 147. In an exemplary embodiment, for example, where the inserting portion 147 has a circular horizontal cross-section, the first penetration hole 131 may have a circular shape, and a diameter d1 of the cross-section of the inserting portion 147 may be substantially the same as a diameter d2 of the first penetration hole 131. The maximum dimension d1 may be substantially the same as the minimum dimension d2.

Figure 6:
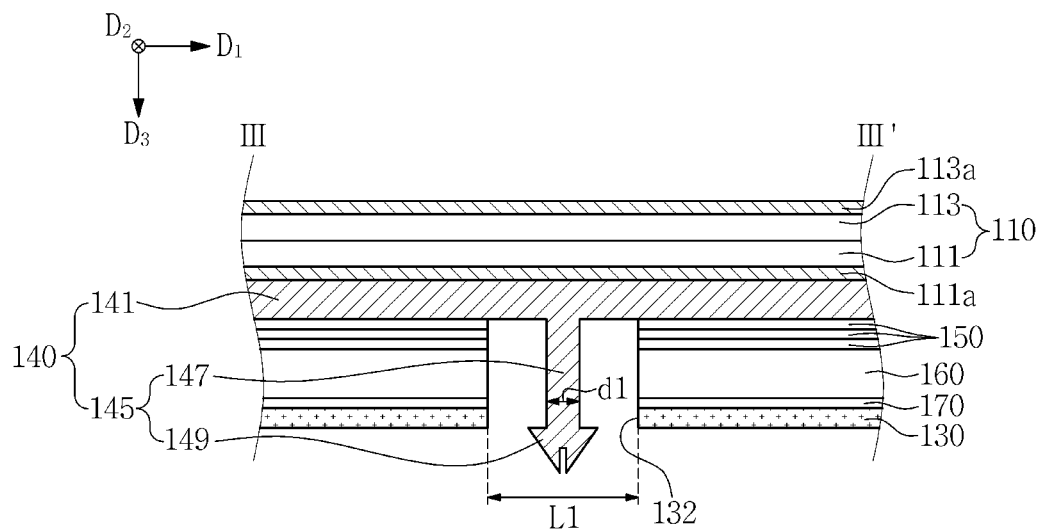
FIG. 6 is a cross-sectional view taken along line of FIG. 1.
Figure 7:
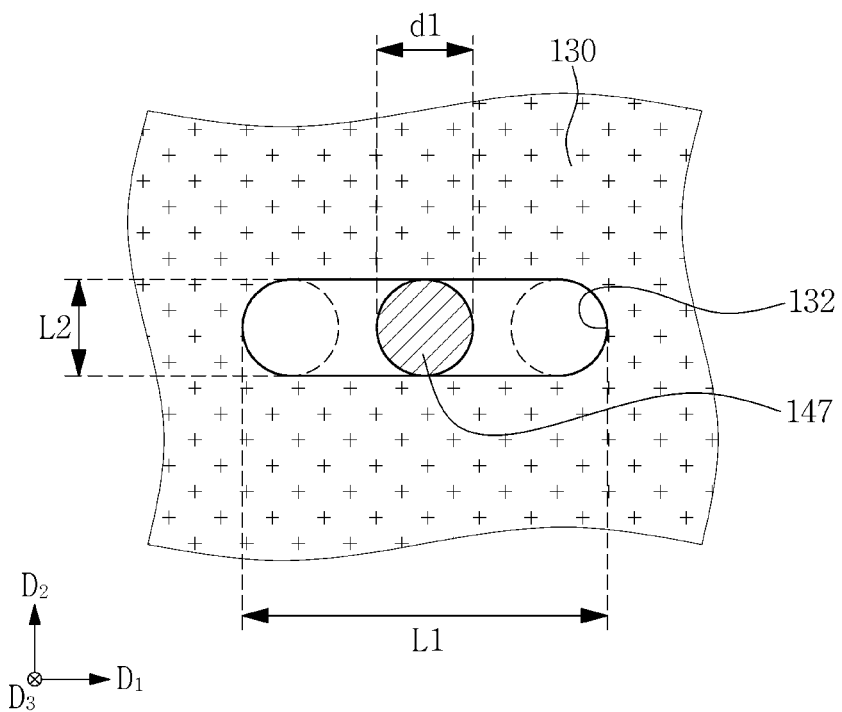
FIG. 7 is a rear view illustrating an enlarged portion of FIG. 6.

FIG. 6 is a cross-sectional view taken along line of FIG. 1, and FIG. 7 is a rear view illustrating an enlarged portion illustrated in FIG. 6. The fixing portion 149 of the coupling portion 145 will be omitted in FIG. 7 for ease of description.

In reference to FIGS. 6 and 7, the coupling portion 145 of the second frame member 140 extends through the optical sheet 150, the light guide plate 160 and the reflective sheet 170 to be coupled to the second penetration hole 132 of the first frame member 130.

The coupling portion 145 includes the inserting portion 147 extended through and disposed in the second penetration hole 132 and the fixing portion 149 disposed outside the second penetration hole 132.

The second penetration hole 132 may extend in a direction in which the display panel is bent, for example, the first direction D1. Hereinafter, for ease of description, a length of the second penetration hole 132 in the first direction D1 is denoted as "L1," and a width thereof in the second direction D2 is denoted as "L2."

The length L1 of the second penetration hole 132 in the first direction D1 may be greater than the diameter d1 of the cross-section of the inserting portion 147 and the width L2 of the second penetration hole 132 in the second direction D2 may be substantially the same as the diameter d1 of the cross-section of the inserting portion 147.

Accordingly, the inserting portion 147 may be movable along the first direction D1 within the second penetration hole 132. That is, the inserting portion 147 may be movable in the direction in which the display panel is bent.

As such, the inserting portion 147 is coupled to the first penetration hole 131, which is relatively adjacent to the light source unit 120 (refer to FIG. 1), to thereby be fixed (e.g., non-movable) to the first penetration hole 131. On the other hand, the inserting portion 147 is coupled to the second penetration hole 132, which is relatively away from the light source unit 120 (refer to FIG. 1), to thereby be movable along the direction in which the display panel is bent.

Accordingly, where an external force is imposed and the display panel 110 is bent in a direction, for example, in the first direction D1, the first frame member 130 including or formed of a superelastic alloy may be bent in the same direction as the direction in which the display panel 110 is bent, and the second frame member 140 coupled to the first frame member 130 may move in the same direction as the direction in which the display panel 110 is bent. In addition, the optical components such as the optical sheet 150, the light guide plate 160 and the reflective sheet 170 which are each coupled simultaneously to the second frame member and 140 may move in the same direction as the direction in which the display panel is bent as the second frame member 140.

Accordingly, in the backlight unit and the display device which includes the backlight unit according to one or more exemplary embodiments of the invention, the frame members configured to support and fix the flexible display panel include or are formed of a superelastic alloy and a highly elastic polymer material, and thus where an external force is imposed to the display device, the frame members are elastically deformed from an initial shape (e.g., flat) state thereof along with the display panel and where the external force is removed, the frame members are elastically restored into the initial shape.

Further, in the backlight unit and the display device which includes the backlight unit according to one or more exemplary embodiments of the invention, the frame members configured to support and fix the flexible display panel may reduce gaps therein due to misalignment between the optical components, such that misalignment among the optical components, which occurs when the display device is bent, may be significantly reduced or effectively prevented.

From the foregoing, it will be appreciated that various embodiments in accordance with the present disclosure have been described herein for purposes of illustration, and that various modifications may be made without departing from the scope and spirit of the invention. Accordingly, the various exemplary embodiments disclosed herein are not intended to be limiting of the true scope and spirit of the invention. Various features of the above described and other exemplary embodiments can be mixed and matched in any manner, to produce further exemplary embodiments consistent with the invention.

What is claimed is:

1. A backlight unit comprising:
   a light source which generates light; and
   frame members which accommodate the light source,
   wherein
   the frame members comprise:
      a first frame member which is bent in a first direction; and
      a second frame member which overlaps an edge portion of the first frame member,
   the first frame member includes a first hole at the edge portion,
   the second frame member includes a first coupling portion coupled to the first hole,
   a first distance between an inner wall of the first hole and the first coupling portion in the first direction is greater than a second distance between the inner wall of the first hole and the first coupling portion in a second direction perpendicular to the first direction,
   the first frame member comprises a superelastic alloy, and
   the second frame member comprises an elastomer.

2. The backlight unit of claim 1, wherein the first frame member comprises at least one selected from a shape memory alloy, an Ni—Ti alloy, an Ni—Al alloy, a Cu—Zn—Ni alloy, a Cu—Al—Ni alloy, a Cu—Al—Mn alloy, a Ti—Ni—Cu—Mo alloy, a Co—Ni—Ga: Fe alloy, an Ag—Ni alloy, an Au—Cd alloy, a Fe—Pt alloy, a Fe—Ni alloy and an In—Cd alloy.

3. The backlight unit of claim 1, wherein the second frame member comprises at least one selected from polydimethyl siloxane, polysilicon, polyurethane, and a styrene block copolymer.

4. The backlight unit of claim 1, wherein the first frame member further includes a second hole at the edge portion.

5. The backlight unit of claim 1, wherein the first hole has one of a circular shape, an elliptical shape and a slot shape.

6. The backlight unit of claim 4, wherein the second frame member further includes a second coupling portion coupled to the second hole.

7. The backlight unit of claim 6, wherein
   the first coupling portion includes a first inserting portion surrounded by the first hole, and a first fixing portion extended from the first inserting portion and disposed outside the first hole, and
   the second coupling portion includes a second inserting portion surrounded by the second hole, and a second fixing portion extended from the second inserting portion and disposed outside the second hole.

8. The backlight unit of claim 7, wherein the first and second fixing portions have one of a hook shape and a wedge shape.

9. The backlight unit of claim 7, wherein the second hole has a same diameter as a diameter of the second inserting portion.

10. The backlight unit of claim 9, wherein the first hole extends parallel to the first direction.

11. The backlight unit of claim 10, wherein a distance between the light source and the second hole is less than a distance between the light source and the first hole, in the first direction.

12. The backlight unit of claim 1, wherein the second frame member further includes a superelastic wire-shaped member disposed within the second frame member.

13. The backlight unit of claim 12, wherein the superelastic wire-shaped member comprises at least one selected from a shape memory alloy, an Ni—Ti alloy, an Ni—Al alloy, a Cu—Zn—Ni alloy, a Cu—Al—Ni alloy, a Cu—Al—Mn alloy, a Ti—Ni—Cu—Mo alloy, a Co—Ni—Ga: Fe alloy, an Ag—Ni alloy, an Au—Cd alloy, a Fe—Pt alloy, a Fe—Ni alloy and an In—Cd alloy.

14. The backlight unit of claim 12, wherein the superelastic wire-shaped member has a closed-loop shape.

15. A display device comprising:
a display panel which is bent in a first direction and displays an image with light;
a light source which generates and provides the light to the display panel; and
frame members which are coupled directly to each other and accommodate the display panel and the light source,
wherein the frame members coupled directly to each other comprise:
a first frame member which is bent in a same direction in which the display panel is bent and comprises a superelastic alloy, the first frame member including a penetration hole at an edge portion; and
a second frame member which overlaps the edge portion of the first frame member and comprises an elastomer, the second frame member including a coupling portion coupled to the penetration hole of the first frame member,
wherein
the second frame member which comprises the elastomer is coupled directly to the edge portion of the first frame member which comprises the superelastic alloy to accommodate the light source in the frame members, and
a first distance between an inner wall of the penetration hole of the first frame member and the coupling portion in the first direction is greater than a second distance between the inner wall of the penetration hole and the coupling portion in a second direction perpendicular to the first direction.

16. The display device of claim 15, wherein the superelastic alloy comprises at least one selected from a shape memory alloy, an Ni—Ti alloy, an Ni—Al alloy, a Cu—Zn—Ni alloy, a Cu—Al—Ni alloy, a Cu—Al—Mn alloy, a Ti—Ni—Cu—Mo alloy, a Co—Ni—Ga: Fe alloy, an Ag—Ni alloy, an Au—Cd alloy, a Fe—Pt alloy, a Fe—Ni alloy and an In—Cd alloy.

17. The display device of claim 15, wherein the elastomer comprises at least one selected from polydimethyl siloxane, polysilicon, polyurethane, and a styrene block copolymer.

18. The backlight unit of claim 1, wherein
the first coupling portion of the second frame member includes a first inserting portion having a diameter which is surrounded by the first hole,
a length of the first hole is greater than the diameter of the first inserting portion in the first direction,
a width of the first hole is the same as the diameter of the first inserting portion in the second direction.

19. The backlight unit of claim 1, further comprising at least one of a light guide plate, an optical sheet and a reflective sheet between the first and second frame members,
wherein at least one of the light guide plate, the optical sheet and the reflective sheet includes a hole coupled to the first coupling portion.

20. The backlight unit of claim 4, wherein the first hole is greater than the second hole in the first direction.

21. The backlight unit of claim 20, wherein a length of the first hole is greater than a length of the second hole in the first direction.

22. The backlight unit of claim 21, wherein a width of the first hole is the same as a width of the second hole in second direction.

* * * * *